May 7, 1929.  F. L. KIRBY  1,712,440
TIRE CARRIER FASTENER
Filed March 23, 1927  2 Sheets-Sheet 1
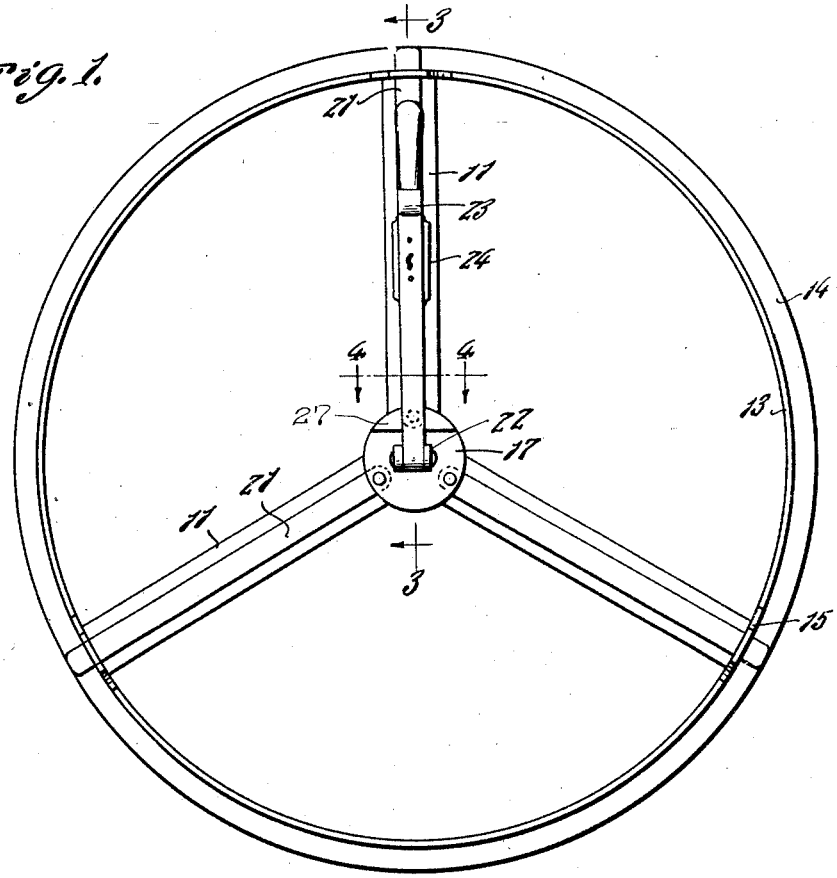
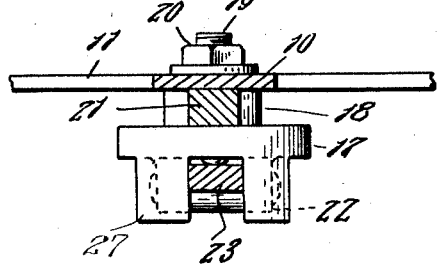
F. L. Kirby
INVENTOR
BY Victor J. Evans
ATTORNEY

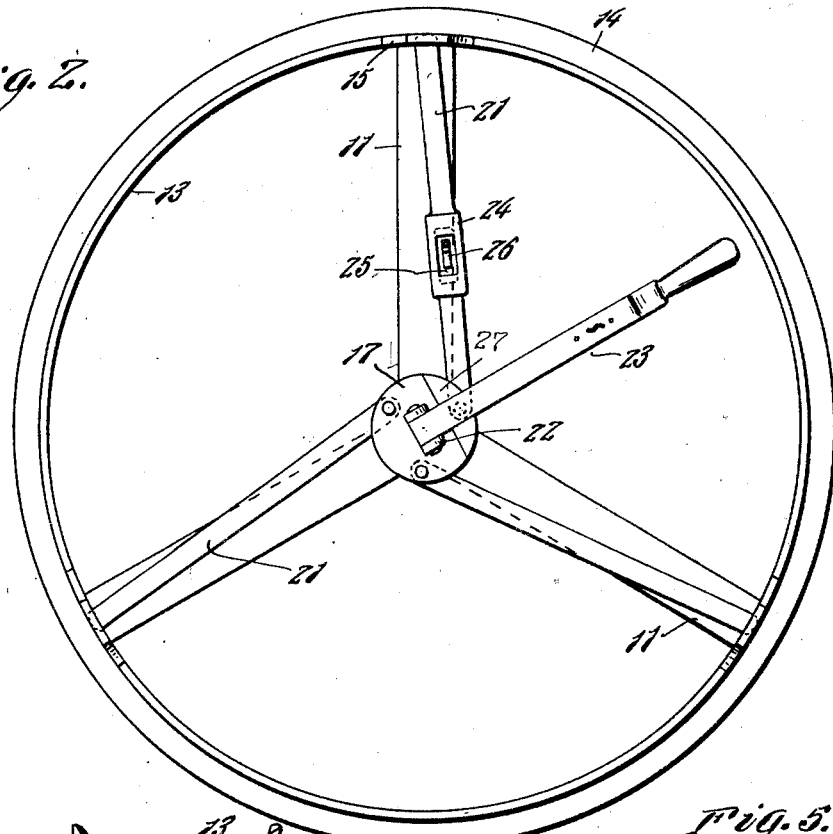

Patented May 7, 1929.

1,712,440

UNITED STATES PATENT OFFICE.

FRANCIS LEE KIRBY, OF MAGDALENA, NEW MEXICO.

TIRE-CARRIER FASTENER.

Application filed March 23, 1927. Serial No. 177,789.

This invention relates to tire carriers embodying among other characteristics a locking mechanism devoid of nuts, bolts, lugs and other customary fastening elements employed to secure a spare tire upon a carrier.

An object of the invention comprehends an operating mechanism operable by a common handle member.

Another object of the invention comprehends a rim member adapted to support a tire rim.

More specifically stated the handle member is provided with a lock to prevent displacement of the operating mechanism.

A further object consists of an anti-rattler for the handle member and lock.

With the above and other objects in view, the invention further consists of the following novel features and details of construction to be hereinafter more fully described, illustrated in the accompanying drawings, and pointed out in the appended claim.

In the drawings:

Figure 1 is an elevation of the invention while in use.

Figure 2 is a similar view illustrating the relative arrangement of the operating mechanism when retracted to an open position.

Figure 3 is a sectional view taken on line 3—3 of Figure 1.

Figure 4 is a transverse sectional view taken on line 4—4 of Figure 1.

Figure 5 is a fragmentary elevation of a rim member composing a component part of the carrier.

Figure 6 is a perspective of a locking element.

Referring to the drawings in detail, wherein like characters of reference denote corresponding parts, the reference character 10 indicates a disk member provided with radially disposed arms 11 having the outer ends thereof offset as indicated at 12 and connected to the inner side of a rim member 13 provided with a flange portion 14 upon the inner side edge thereof, the purpose of which will be readily apparent. Said rim member is provided with extensions 15 upon the outer edge thereof and provided with openings 16.

A rotatable disk 17 provided with a reduced extension 18 upon the inner side thereof has extended therefrom a reduced extension 19 passed centrally of the disk 10 and having mounted thereon a nut 20 and washer therefor. Said disk 17 is thus mounted for independent rotary movement upon the disk 10. Locking elements 21 radially disposed upon the disk 17 are pivotally mounted upon the inner sides thereof within the space as defined between the inner side of the disk 17 and the adjacent face of the disk 10. The outer ends of the elements 21 are extended through the openings 16 in the extensions 15 of the rim 13 and protrude appreciable distances therethrough to hold a tire rim, not shown, against displacement thereon. Spaced parallel ears 22 carried upon the forward face of the disk 17 have pivotally mounted therebetween an operating lever 23.

One of the elements 21 is provided with an enlarged portion 24 at an appropriate point in its length including a socket portion 25 within which a latch mechanism 25' carried by the handle member 23 may be received. A spring finger 26 carried within the socket portion 25 of the enlarged portion 24 is adapted to frictionally engage the latch mechanism 25' to obviate rattling of the operating lever 23. The latter having the outer end thereof offset to provide ample space between the aforementioned locking element within which the hand may be inserted to conveniently grasp the operating lever in the manipulation thereof.

Movement of the operating lever 23 to the position shown in Figure 2 of the drawings will retract the locking elements 21 from the normal positions as taken in Figure 1 of the drawings. In so doing a tire rim, not shown, carried upon the rim 13 may be readily removed therefrom.

Shoulders 27 outstanding in spaced parallel relation upon the outer side of the rotatable disk 17 are adapted to accommodate the adjacent portion of the operating lever 23 in the manner as best illustrated in Figures 3 and 4 of the drawings. The shoulders are primarily adapted to afford the necessary strength to the operating lever upon the rotatable disk to withstand any pressure which may be exerted on the lever and disk in the manipulation of the mechanism without binding or in any way injuring the pivot connection as provided between the rotatable disk member and operating lever.

The invention is susceptible of various changes in its form, proportions and minor details of construction, and the right is herein reserved to make such changes as properly fall within the scope of the appended claim.

Having described the invention what is claimed is:—

A latch mechanism comprising a stationary disk, a rotatable disk provided with a reduced extension having connection with the stationary disk spacing the disks apart, locking elements pivotally mounted and eccentrically disposed upon the inner sides of the rotatable disk, shoulders outstanding in spaced parallelism upon the outer face of the rotatable disk, spaced ears carried by the rotatable disk, and an operating lever pivotally mounted between the ears and adapted to assume an operative position when disposed between the shoulders.

FRANCIS LEE KIRBY.